US010790744B1

(12) United States Patent
Lu et al.

(10) Patent No.: US 10,790,744 B1
(45) Date of Patent: Sep. 29, 2020

(54) SINGLE INDUCTOR MULTIPLE OUTPUT ADAPTIVE LOOP CONTROL

(71) Applicant: Analog Devices International Unlimited Company, Limerick (IE)

(72) Inventors: Danzhu Lu, Shanghai (CN); Jie He, Shanghai (CN); Suyi Yao, Shanghai (CN)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/358,490

(22) Filed: Mar. 19, 2019

(51) Int. Cl.
*H02M 3/155* (2006.01)
*H02M 1/00* (2006.01)

(52) U.S. Cl.
CPC ...... *H02M 3/155* (2013.01); *H02M 2001/009* (2013.01)

(58) Field of Classification Search
CPC .............. H02M 3/155–1588; H02M 2001/009
See application file for complete search history.

(56) References Cited

U.S. PATENT DOCUMENTS

| | | | |
|---|---|---|---|
| 5,617,015 A | 4/1997 | Goder et al. | |
| 7,256,568 B2 | 8/2007 | Lam et al. | |
| 8,049,472 B2 | 11/2011 | Easwaran et al. | |
| 8,531,165 B2 | 9/2013 | Chen et al. | |
| 8,624,429 B2 | 1/2014 | Jing et al. | |
| 8,975,879 B2 | 3/2015 | Xu et al. | |
| 9,007,039 B2 | 4/2015 | Kim et al. | |
| 9,099,919 B2 | 8/2015 | Jing et al. | |
| 9,203,310 B2 | 12/2015 | Huang et al. | |
| 9,287,781 B2 | 3/2016 | Wilson | |
| 9,479,052 B2 | 10/2016 | Branca | |

(Continued)

FOREIGN PATENT DOCUMENTS

CN 105634279 B 3/2018

OTHER PUBLICATIONS

Bonizzoni, Edoardo, et al., "A 200mA 93% Peak Efficiency Single-Inductor Dual-Output DC-DC Buck Converter", IEEE ISCC Session 29, Analog and Power Management Techniques, 29.5, (Feb. 2007), 3 pgs.

(Continued)

*Primary Examiner* — Thienvu V Tran
*Assistant Examiner* — Peter M Novak
(74) *Attorney, Agent, or Firm* — Schwegman Lundberg & Woessner, P.A.

(57) ABSTRACT

This disclosure describes techniques for controlling switching regulator switching operations. The techniques include generating, using an inductor, a plurality of output voltage signals from an input voltage by controlling one or more switches that vary charging operations of the inductor; generating a feedback control signal based on whether the plurality of output voltage signals are within a range of target values corresponding to the plurality of output voltage signals; selecting a second output voltage signal of the plurality of output voltage signals when the feedback control signal indicates that a first output voltage signal exceeds the range of a first target value of the target values that corresponds to the first output voltage signal; and controlling the one or more switches of the switching regulator based on a difference between the selected second output voltage signal and a second target value.

20 Claims, 6 Drawing Sheets

(56) References Cited

U.S. PATENT DOCUMENTS

| | | | |
|---|---|---|---|
| 2006/0152205 A1* | 7/2006 | Tang | H02M 3/1584 |
| | | | 323/284 |
| 2008/0252277 A1 | 10/2008 | Sase et al. | |
| 2011/0302818 A1* | 12/2011 | Samaras | F41C 9/085 |
| | | | 42/90 |
| 2019/0302818 A1* | 10/2019 | Liu | G05F 1/565 |

OTHER PUBLICATIONS

Trevisan, D., et al., "Digital Control of Single-Inductor Dual-Output dc-dc converters in Continuous-Conduction Mode", IEEE 36th Power Electronics Specialists Conference, Recife, Brazil, (Jun. 2005), 7 pgs.

Xu, Weiwei, et al., "A Single-Inductor Multiple-Bipolar-Output (SIMBO) Converter with Fully-Adaptive Feedback Matrix and Improved Light-Load Ripple", Proc. of the IEEE ESSCIRC, Helsinki, Finland, (Sep. 2011), 5 pgs.

* cited by examiner

SINGLE INDUCTOR MULTIPLE OUTPUT ADAPTIVE LOOP CONTROL

FIELD OF THE DISCLOSURE

This document pertains generally, but not by way of limitation, to switching regulators, and more particularly, to adaptive loop control of the switching regulators.

BACKGROUND

Switching regulators typically use one or more switches (e.g., transistors) for alternately opening and closing a current path through a reactive element such as an inductor according to a particular frequency. In operation, a DC voltage is applied across the inductor, and electrical energy is transferred to one or more loads connected to the inductor by alternately opening and closing the switches as a function of the frequency. The amount of electrical energy transferred to the loads is a function of the frequency at which the switches are opened and closed. Switching regulators that generate an output voltage lower than an input voltage are termed buck or step-down converters, and those that generate an output voltage higher than the input voltage are termed boost or step-up converters. Switching regulators are widely used for powering electronic devices, particularly battery-powered devices, such as portable cellular phones, laptop computers, and other electronic systems in which efficient use of power is desirable.

SUMMARY OF THE DISCLOSURE

In some certain embodiments, a system and method are provided for controlling switching operations of a switching regulator. The system may include a switching regulator configured to use an inductor to generate a plurality of output voltage signals from an input voltage by controlling one or more switches that vary charging operations of the inductor. The system may further include transient detection circuitry coupled to receive the plurality of output voltage signals and configured to generate a feedback control signal based on whether the plurality of output voltage signals are within a range of target values corresponding to the plurality of output voltage signals. The system may further include feedback selection circuitry coupled to receive the plurality of output voltage signals and configured to select a second output voltage signal of the plurality of output voltage signals when the feedback control signal indicates that a first output voltage signal of the plurality of output voltage signals exceeds the range of a first target value of the target values that corresponds to the first output voltage signal. The system may further include control circuitry configured to control the one or more switches of the switching regulator based on a difference between the second output voltage signal selected by the feedback selection circuitry and a second target value of the target values that corresponds to the second output voltage signal.

In some implementations, the transient detection circuitry is configured to output a first value as the feedback control signal to indicate that the first output voltage signal exceeds the range of the first target value, and the transient detection circuitry is configured to output a second value as the feedback control signal to indicate that the second output voltage signal exceeds the range of the second target value. In some implementations, the transient detection circuitry may include a first comparator circuit configured to generate a first signal when the first output voltage signal exceeds the first target value incremented by a first offset value; a second comparator circuit configured to generate a second signal when the first output voltage signal exceeds the first target value decremented by the first offset value; and a first set of logic elements configured to generate the first value when the first output voltage signal exceeds the range of the first target value by logically combining the first and second signals.

In some implementations, the transient detection circuitry may include a third comparator circuit configured to generate a third signal when the second output voltage signal exceeds the second target value incremented by the first offset value; a fourth comparator circuit configured to generate a fourth signal when the second output voltage signal exceeds the second target value decremented by the first offset value; and a second set of logic elements configured to generate the second value when the second output voltage signal exceeds the range of the second target value by logically combining the third and fourth signals.

In some implementations, the first set of logic elements may include a first logic element coupled to a first storage element, the second set of logic elements may include a second logic element coupled to a second storage element, and a first output of the first storage element may be logically combined with a second output of the second storage element to generate the feedback control signal. In some implementations, the first storage element may be triggered to store and output a given value in response to an output of the first logic element that combines the first and second signals, and the first output of the first storage element may be reset in response to an output of the second logic element that combines the third and fourth signals.

In some implementations, the feedback selection circuitry may be coupled to receive the plurality of target values, and the feedback selection circuitry may further be configured to select the second target value based on the feedback control signal and output to the control circuitry the selected second target value. In some implementations, the feedback selection circuitry may include a first selection circuit coupled to the plurality of output voltage signals and the feedback control signal, wherein the first selection circuit may be configured to select the second output voltage signal for output based on the feedback control signal; and a second selection circuit coupled to the plurality of target values and the feedback control signal, wherein the second selection circuit may be configured to select the second target value for output based on the feedback control signal.

In some implementations, the control circuitry may include a comparator circuit configured to compare the second output voltage signal selected by the feedback selection circuitry with the second target value. In some implementations, the control circuitry may further be configured to apply slope compensation to an output of the comparator circuit. In some implementations, the one or more switches of the switching regulator may include a first set of switches that control common-loop charging operations of the inductor and a second set of switches that control differential-loop charging operations of the inductor.

In some implementations, the control circuitry may be further configured to aggregate the plurality of output voltage signals into a first value; aggregate the plurality of target values into a second value; control the first set of switches based on a comparison between the first and second values; and control the second set of switches based on the difference between the second output voltage signal selected by the feedback selection circuitry and the second target value. In some implementations, a first set of the plurality of output voltage signals including the first output voltage signal may be received from a first terminal of the inductor, and a second set of the plurality of output voltage signals may be received from a second terminal of the inductor.

In some embodiments, a method for controlling switching operations of a switching regulator includes generating, using an inductor, a plurality of output voltage signals from an input voltage by controlling one or more switches that vary charging operations of the inductor; generating a feedback control signal based on whether the plurality of output voltage signals are within a range of target values corresponding to the plurality of output voltage signals; selecting a second output voltage signal of the plurality of output voltage signals when the feedback control signal indicates that a first output voltage signal of the plurality of output voltage signals exceeds the range of a first target value of the target values that corresponds to the first output voltage signal; and controlling the one or more switches of the switching regulator based on a difference between the selected second output voltage signal and a second target value of the target values that corresponds to the second output voltage signal.

In some implementations, the one or more switches of the switching regulator may include a first set of switches that control common-loop charging operations of the inductor and a second set of switches that control differential-loop charging operations of the inductor. In some implementations, the method includes aggregating the plurality of output voltage signals into a first value; aggregating the plurality of target values into a second value; controlling the first set of switches based on a comparison between the first and second values; and controlling the second set of switches based on the difference between the second output voltage signal and the second target value.

In some implementations, the method includes selecting the second target value from the plurality of target values when the feedback control signal indicates that the first output voltage signal exceeds the range of the first target value. In some implementations, the method includes generating a first signal when the first output voltage signal exceeds the first target value incremented by a first offset value; generating a second signal when the first output voltage signal exceeds the first target value decremented by the first offset value; and logically combining the first and second signals to indicate that the first output voltage signal exceeds the range of the first target value.

In some embodiments, an apparatus is provided for controlling switching operations of a switching regulator that includes means for generating, using an inductor, a plurality of output voltage signals from an input voltage by controlling one or more switches that vary charging operations of the inductor; means for generating a feedback control signal based on whether the plurality of output voltage signals are within a range of target values corresponding to the plurality of output voltage signals: means for selecting a second output voltage signal of the plurality of output voltage signals when the feedback control signal indicates that a first output voltage signal of the plurality of output voltage signals exceeds the range of a first target value of the target values that corresponds to the first output voltage signal; and means for controlling the one or more switches of the switching regulator based on a difference between the selected second output voltage signal and a second target value of the target values that corresponds to the second output voltage signal.

In some implementations, the apparatus further includes means for generating a first signal when the first output voltage signal exceeds the first target value incremented by a first offset value; means for generating a second signal when the first output voltage signal exceeds the first target value decremented by the first offset value; and means for logically combining the first and second signals to indicate that the first output voltage signal exceeds the range of the first target value.

This overview is intended to provide an overview of subject matter of the present patent application. It is not intended to provide an exclusive or exhaustive explanation of the inventive subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

This disclosure describes, among other things, techniques to vary the switching frequency of a switching regulator that delivers voltages to multiple channels based on a transient that appears on a given channel, such as to minimize cross regulation.

The output of switching regulators that provide voltage outputs to multiple channels, known as single-inductor multiple-output (SIMO) regulators, is typically subject to cross regulation. Such cross regulation arises because the inductor current is shared across multiple channels so that when the output voltage of one channel changes during a load or line transient, the voltage of the other channels is influenced. In many cases, this cross regulation interferes with the loads and significantly degrades performance of the switching regulator.

One way to reduce the cross regulation of the SIMO switching regulators involves controlling a common-mode loop and a differential-mode loop separately. Particularly, typical SIMO switching regulators have a common mode with a first set of switches that control the voltage delivered to all of the channels and a differential mode with a second set of switches each coupled to a respective channel to control voltage delivery to a particular channel. Cross regulation is typically reduced by computing an average sum of the voltages of all the channels and using this computed average sum to control the switches of the common mode.

Also, an average difference among all the channel voltages is computed and used to control the differential-mode switches. While this approach may work well in some cases, the overall performance is relatively poor as transients that appear on one channel still influence switching and voltages of other channels.

To address the shortcomings of such approaches, the disclosed techniques minimize the cross regulation in SIMO switching regulators by detecting a transient on a given channel and adjusting the switching operations of the differential-mode loop in response to the detected transient. Particularly, rather than adjusting the differential-mode loop based on some aggregation of voltages across all the channels, the disclosed techniques individualize the switching operations for the differential-mode loop based on the channel on which a transient appears. For example, when a transient is detected on a given channel, the feedback and reference voltages of only the remaining channels are used to control the switching operations of the differential loop. Specifically, the feedback and reference voltages of the channel on which the transient is detected are excluded from controlling the switching operations of the differential loop. In an embodiment, the common-mode switching operations continue to be controlled based on an aggregation (e.g., a sum) of the errors across the voltages of all the channels including the given channel on which the transient is detected.

Figure 1:
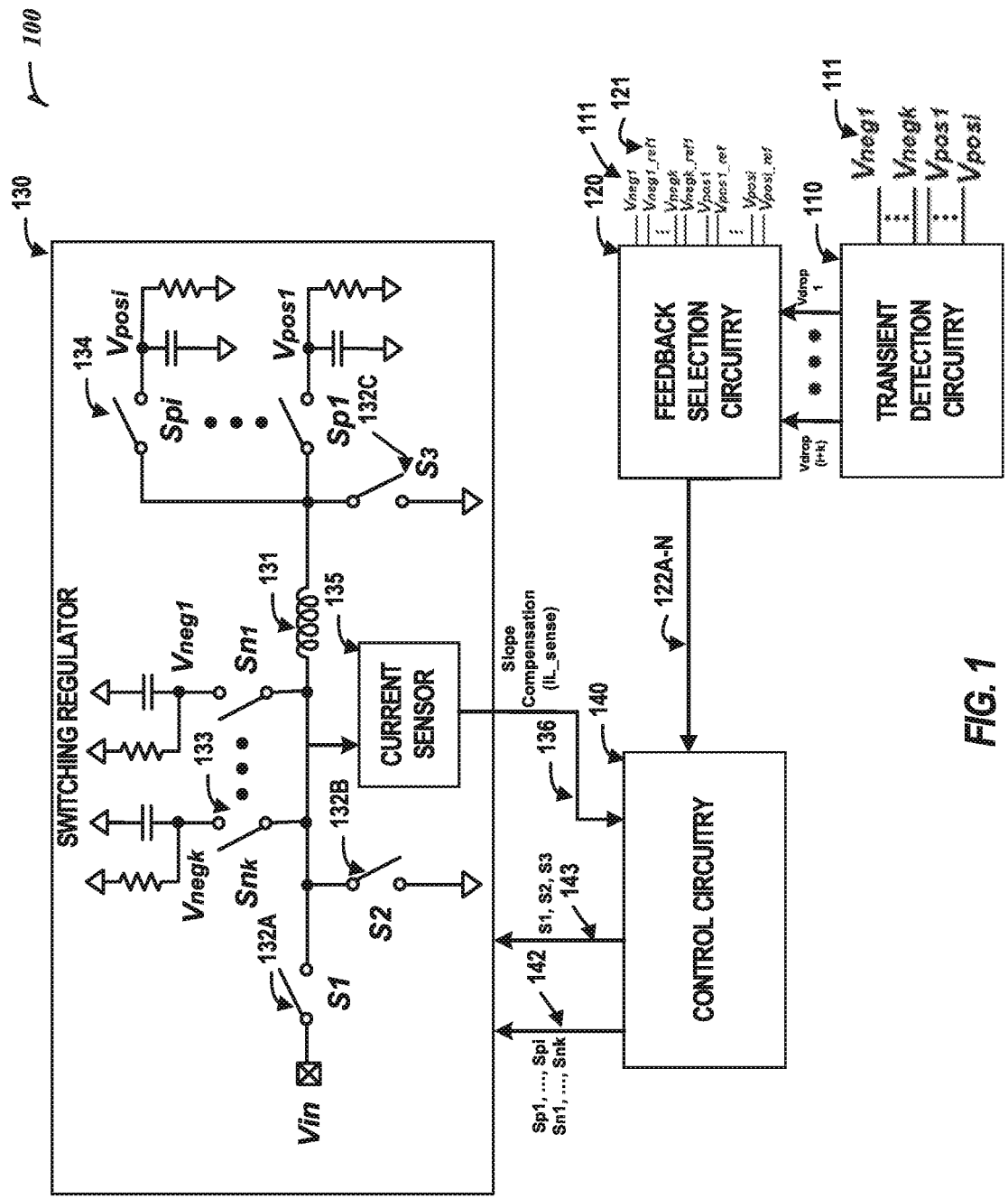
FIG. 1 is a block diagram of an example of a single-inductor multiple-output (SIMO) switching regulator system in accordance with various embodiments.

FIG. 1 is a block diagram of an example of a SIMO switching regulator system 100 in accordance with various embodiments. The SIMO switching regulator system 100 includes a switching regulator 130, control circuitry 140, feedback selection circuitry 120, and transient detection circuitry 110.

The switching regulator 130 may be a current-mode (CM) DC/DC switching power supply, also known as a current-mode DC/DC converter. Many other converter configurations can also benefit from the present disclosure. The type of converter shown in FIG. 1 is a peak current-mode converter. An overview of the functionality of the switching regulator 130 is provided below, and further details are provided in U.S. Pat. No. 5,617,015, filed Jun. 7, 1995, which is hereby incorporated by reference in its entirety.

During operation, the control circuitry 140 turns ON and OFF common loop switches 132A-C (S1, S2, and S3, respectively) of the switching regulator 130 based on common loop signals 143 at a particular frequency to control current flowing to negative channels 133 (Vnegk ... Vneg1) and positive channels 134 (Vposi ... Vpos1). The control circuitry 140 also turns ON and OFF differential loop switches (Snk ... Sn1 and Spi ... Sp1) based on differential loop signals 142 to control current flowing to individual positive and negative channels.

In one example, when the control circuitry 140 turns ON the switches 132A and 132C, an input voltage Vin is applied to an inductor 131 through the switch 132A (S1) and causes a ramping current to flow through the inductor 131 in one phase. This current flows through a current sensor 135 (e.g., current-sense circuitry). In another phase, the current from the inductor 131 (which may not be the same ramping current as in the previous phase) flows through each of the negative channels 133 coupled to one terminal of the inductor 131 and through each of the positive channels 134 coupled to another terminal of the inductor 131. The control circuitry 140 controls which individual ones of the positive and negative channels receive the current that flows through the inductor 131 by turning ON and OFF respective ones of the differential loop switches (Snk ... Sn1 and Spi .... Sp1).

The control circuitry 140 receives the voltage outputs of each of the positive and negative channels. Based on a comparison of the voltages with a reference voltage, the control circuitry 140 determines when to turn ON or OFF the common loop switches 132A-C. In an embodiment, the control circuitry 140 computes a sum of all the positive channel voltages (Vposi ... Vpos1) and also computes a sum of all the negative channel voltages (Vnegk ... Vneg1). The control circuitry 140 computes a difference between the sums of the positive and negative voltages and applies this voltage difference to the negative input of a transconductance error amplifier (not shown). A reference voltage Vref is applied to the positive input of the transconductance error amplifier. The output current of the transconductance error amplifier corresponds to the difference between the average actual output voltage across all the channels and the desired output voltage. A voltage across a capacitor at the output of the transconductance error amplifier is adjusted up or down based on the positive or negative current output of the transconductance error amplifier. Such a voltage is referred to as a control voltage Vcomp.

The control voltage Vcomp is applied to a pulse-width-modulation (PWM) comparator (also known as a current comparator, not shown). The ramping voltage across the current-sense circuitry, when the switch 132A is ON, is sensed by a differential amplifier, in the current sensor 135, having a certain gain, and, when the output of the amplifier in the current sensor 135, provided to the control circuitry 140 as an IL_sense signal 136, exceeds the control voltage Vcomp, the PWM comparator is triggered to output a signal in the control circuitry 140. The control circuitry 140 logically combines this signal with a clock signal received by the control circuitry 140 to turn the switch 132A ON or OFF and to control companion switches 132B and 132C. In an embodiment, the switches 132B and 132C are companion switches to the switch 132A and turn ON or OFF at the same time when the switch 132A is turned ON or OFF. In an embodiment, when the switch 132A is turned ON, the switches 132B and/or 132C are turned OFF. For example, when the switch 132A turns OFF, the switch 132B turns ON to discharge the inductor 131, causing a downward ramping current. In this way, the peak current through the inductor 131 for each cycle is regulated to provide the required average current to maintain a regulated output voltage at each positive and negative channel. An example of when certain ones of the common loop switches 132A-C and differential loop switches are turned ON and OFF based on an output of the PWM comparator associated with each loop is provided in U.S. Pat. No. 9,479,052, filed Mar. 13, 2015, which is hereby incorporated by reference in its entirety.

In some embodiments, the control circuitry 140 controls individual ones of the differential loop switches based on the transient detection circuitry 110 detecting a transient on one of the channels. For example, when the transient detection circuitry 110 indicates that a transient appears in a given output channel (for example, a load transient), the control circuitry 140 may use the feedback and reference voltages of the other channels to control the differential loop switches to control the voltage in the differential loop. In this way, cross regulation in the other channels is minimized when the transient appears in the given channel.

In some embodiments, the positive and negative output voltages 111 from the positive and negative channels 134, 133 are received by the feedback selection circuitry 120 and the transient detection circuitry 110. The transient detection circuitry 110 determines whether a given voltage of the positive and negative channels exceeds a specified range of voltages (e.g., target values) based on voltage thresholds 121 associated with each channel. In response to detecting that the voltage of a given channel of the positive and negative channels exceeds the specified range associated with the given channel, the transient detection circuitry 110 generates a signal (Vdrop(i+k) . . . Vdrop1) identifying the given channel as having a transient. The transient detection circuitry 110 provides the signal to the feedback selection circuitry 120 identifying the given channel as having the transient. In some implementations, the transient detection circuitry 110 generates a signal identifying all other channels that do not have the transient (e.g., excluding the given channel) and provides that signal to the feedback selection circuitry 120.

In some embodiments, each channel has a corresponding different range of target values used to detect a transient on the channel. The range may be based on the type of load associated with the channel and may be dynamically adjusted during operation of the switching regulator 130. For example, all the positive channels may have a same first range of target values and all the negative channels may have a same second range of target values, different from the first range. In some implementations, to compute the range of voltages for the channels, the transient detection circuitry 110 receives a reference voltage 121, as a target value for each channel, and computes a maximum and minimum voltage for the range by adding and subtracting an offset to the reference voltage 121. For example, in the case of one positive channel and one negative channel, the transient detection circuitry 110 receives a first reference voltage, as a target value for the positive channel, and a second reference voltage, as a target value for the negative channel. The transient detection circuitry 110 computes a first range for the positive channel having a maximum and minimum voltage by adding and subtracting a first offset to and from the first reference voltage, and computes a second range for the negative channel having a maximum and minimum voltage by adding and subtracting a second offset to and from the second reference voltage. The first and second offsets may be set to a fixed percentage (e.g., 2 percent) of the corresponding first and second reference voltages or to a specific value (e.g., 20 millivolts). The offset that is used to compute the range of the target values may be the same for all the channels or may be different for each channel. In some implementations, the offset is a first same value for all the positive channels and is a second same value for all the negative channels, the second same value being different from the first same value.

The feedback selection circuitry 120 receives the positive and negative channel voltages output by the switching regulator 130. The feedback selection circuitry 120 receives corresponding reference voltages, which may be the same as the target values received by the transient detection circuitry 110, for each received positive and negative channel. The feedback selection circuitry 120 selects which of the positive and negative channels influence the control of the differential loop switches by the control circuitry 140 using the differential loop signals 142. Specifically, the feedback selection circuitry 120, based on the output of the transient detection circuitry 110, selects which set of channel voltage signals and corresponding target value signals to output as signals 122A-N to the control circuitry 140. In some implementations, the feedback selection circuitry 120 selects a subset of the positive and negative channels and corresponding target values that excludes the channel or channels indicated by the transient detection circuitry 110 as having a transient. In this way, only the channels on which a transient is not present, or has not been detected by the transient detection circuitry 110, can influence control of the differential loop switches (Snk . . . Sn1 and Spi . . . . Sp1) of the switching regulator 130. The control circuitry 140 computes a difference between the signals 122A-N (representing channel voltages and target values or reference voltages in the subset of channels that do not have a transient) using one or more error amplifiers and compares that error to a slope signal (e.g., a predetermined clock signal with the same frequency as the switching frequency of the switching regulator 130), using one or more comparators, to determine which of the differential loop switches to turn ON or OFF.

For example, in the case of a single positive and a single negative channel, when the transient detection circuitry 110 indicates that a transient is detected on the negative channel, the feedback selection circuitry 120 outputs as signals 122A-N the current positive channel voltage output and the corresponding positive channel target value. The control circuitry 140 computes a difference between the current positive channel voltage output and the corresponding positive channel target value using an error amplifier and compares that error to the slope signal (e.g., a predetermined clock signal with the same frequency as the switching frequency of the switching regulator 130) to determine which of the differential loop switches to turn ON or OFF. At some later point, when the transient detection circuitry 110 indicates that a transient is detected on the positive channel, the feedback selection circuitry 120 outputs as signals 122A-N the current negative channel voltage output and the corresponding negative channel target value. Similarly, the control circuitry 140 computes a difference between the current negative channel voltage output and the corresponding negative channel target value using an error amplifier and compares that error to the slope signal (e.g., a predetermined clock signal with the same frequency as the switching frequency of the switching regulator 130) to determine which of the differential loop switches to turn ON or OFF.

Figure 2:
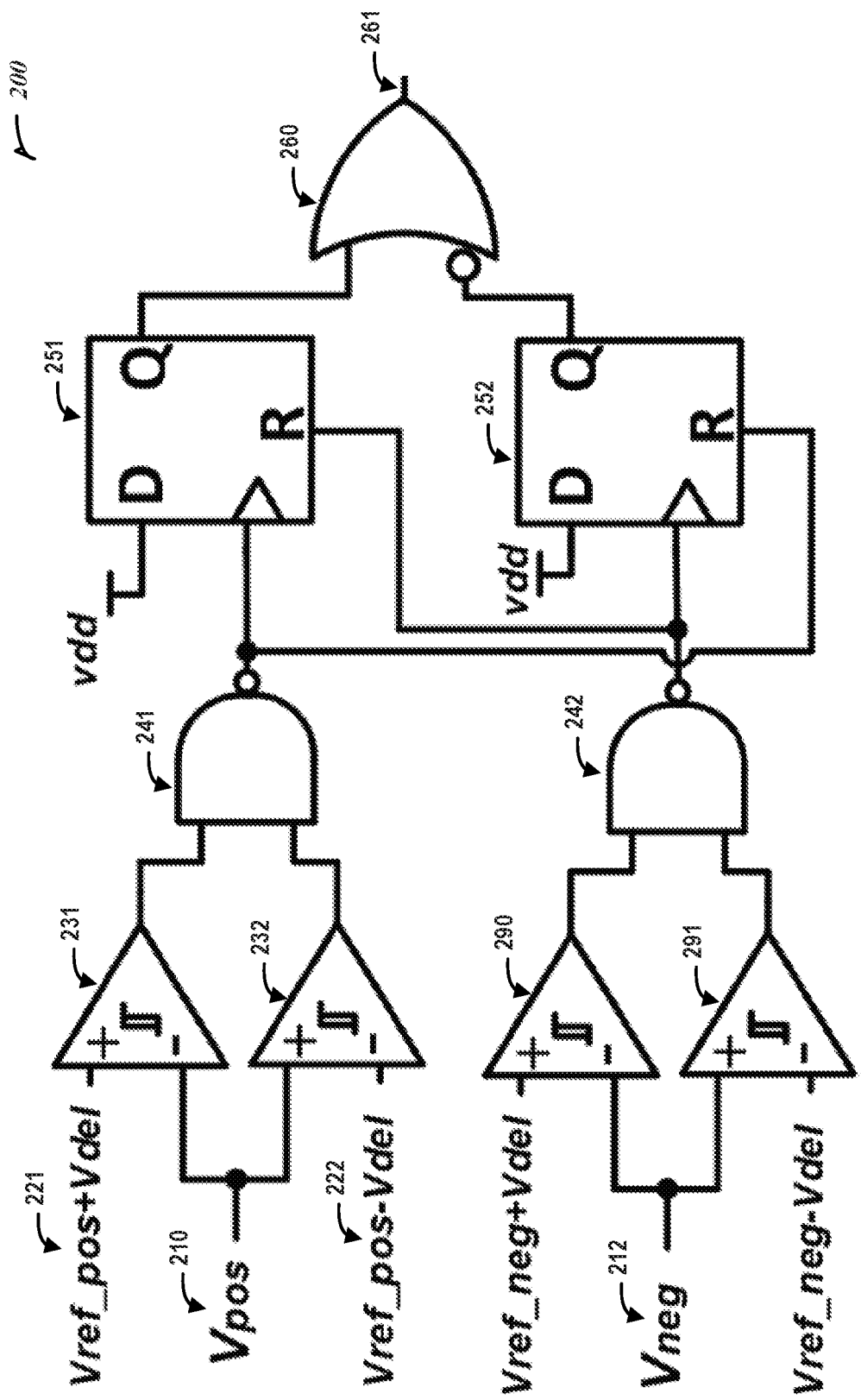
FIG. 2 is a block diagram of an example of a transient detection circuitry in accordance with various embodiments.

FIG. 2 is a block diagram of an example of a transient detection circuitry 200 in accordance with various embodiments. The transient detection circuitry 200 represents an implementation of the transient detection circuitry 110 in the case of a switching regulator 130 having two channels (e.g., one positive channel, Vpos, and one negative channel, Vneg). The transient detection circuitry 200 includes a first comparator 231, a second comparator 232, a first logic element 241, a second logic element 242, a first logic storage element 251, a second logic storage element 252, and a third logic element 260.

In operation, outputs of the first comparator 231 and the second comparator 232 are logically combined using the first logic element 241 to detect when a positive channel output voltage Vpos 210 of the switching regulator 130 exceeds a range of a target value associated with the positive channel output voltage. A similar configuration of comparators 290 and 291 and the second logic element 242 are provided for detecting when a negative channel output voltage Vneg 212 of the switching regulator 130 exceeds a range of a target value associated with the negative channel output voltage. The outputs of the first and second logic elements 241, 242 control storage and reset operations of the first and second logic storage elements 251, 252. The outputs of the first and second logic storage elements 251, 252 are logically combined using the third logic element 260 (e.g., an OR gate or NOR gate) to generate a signal 261 indicating which channel has a transient for controlling selections made by the feedback selection circuitry 120.

The first and second comparators 231, 232 are configured to output respective logic values indicating whether an input received at a negative terminal exceeds an input received at a positive terminal. For example, the first comparator 231 receives the positive channel output voltage Vpos 210 of the switching regulator 130 at a negative terminal. The transient detection circuitry 200 receives a target value (Vref_pos) associated with the positive channel output voltage Vpos 210 and computes a maximum range value 221 by adding an offset (Vdel) to the received target value. This maximum range value 221 is input to the positive terminal of the first comparator 231. While the positive channel output voltage Vpos 210 of the switching regulator 130 is below the maximum range value 221, the first comparator 231 maintains asserted a signal at the output that is provided to a first input of the first logic element 241 (e.g., a NAND gate). When the positive channel output voltage Vpos 210 of the switching regulator 130 exceeds the maximum range value 221, the first comparator 231 changes the status of (e.g., de-asserts) the signal at the output that is provided to the first input of the first logic element 241 (e.g., a NAND gate). This causes the logic state of the first logic element 241 to change, indicating a transient at the positive channel output voltage Vpos 210.

Similarly, the second comparator 232 receives the positive channel output voltage Vpos 210 of the switching regulator 130 at a positive terminal. The transient detection circuitry 200 receives the target value (Vref_pos) associated with the positive channel output voltage Vpos 210 and computes a minimum range value 222 by subtracting the offset (Vdel) from the received target value. This minimum range value 222 is input to the negative terminal of the second comparator 232. While the positive channel output voltage Vpos 210 of the switching regulator 130 is above the minimum range value 222, the second comparator 232 maintains asserted a signal at the output that is provided to a second input of the first logic element 241 (e.g., a NAND gate). When the positive channel output voltage Vpos 210 of the switching regulator 130 falls below the minimum range value 222, the second comparator 232 changes the status of (e.g., de-asserts) the signal at the output that is provided to the second input of the first logic element 241 (e.g., a NAND gate). This causes the logic state of the first logic element 241 to change, indicating a transient at the positive channel output voltage Vpos 210.

The output of the first logic element 241 is coupled to a clock input of the first logic storage element 251 and to a reset input of the second logic storage element 252. When the logic state of the first logic element 241 changes, the first logic element triggers the first logic storage element 251 to store and output a positive value (e.g., bit value "1" or a value of Vdd received at the input of the first logic storage element 251). Also, when the logic state of the first logic element 241 changes, the first logic element 241 resets the second logic storage element 252 to reset and clear (e.g., set to bit value "0") the output of the second logic storage element 252. Similarly, the output of the second logic element 242 is coupled to a clock input of the second logic storage element 252 and to a reset input of the first logic storage element 251. When the logic state of the second logic element 242 changes, the second logic element 242 triggers the second logic storage element 252 to store and output a positive value (e.g., bit value "1" or a value of Vdd received at the input of the second logic storage element 252). Also, when the logic state of the second logic element 242 changes, the second logic element 242 resets the first logic storage element 251 to reset and clear (e.g., set to bit value "0") the output of the first logic storage element 251.

The third logic element 260 logically combines the outputs of the first and second logic storage elements 251 and 252 to generate an indication of which of the positive and negative channel output voltages has a transient. For example, the third logic element 260 is a NOR gate where a second input coupled to receive the output of the second logic storage element 252 is inverted. In this way, when the first logic storage element 251 outputs a positive value (is asserted) and the second logic storage element 252 outputs a bit value "0" (is de-asserted), the third logic element 260 outputs a signal 261 indicating that a transient was detected on the positive output channel. Similarly, when the first logic storage element 251 outputs a value "0" (is de-asserted) and the second logic storage element 252 outputs a bit value "1" (is asserted), the third logic element 260 outputs a signal 261 indicating that a transient was detected on the negative output channel. In some embodiments, by default, when no transients are detected on either channel, the transient detection circuitry 200 outputs a signal 261 indicating that a transient was detected on the negative output channel to cause the feedback selection circuitry 120 to select the positive output channel to influence the differential loop switches.

Figure 3:
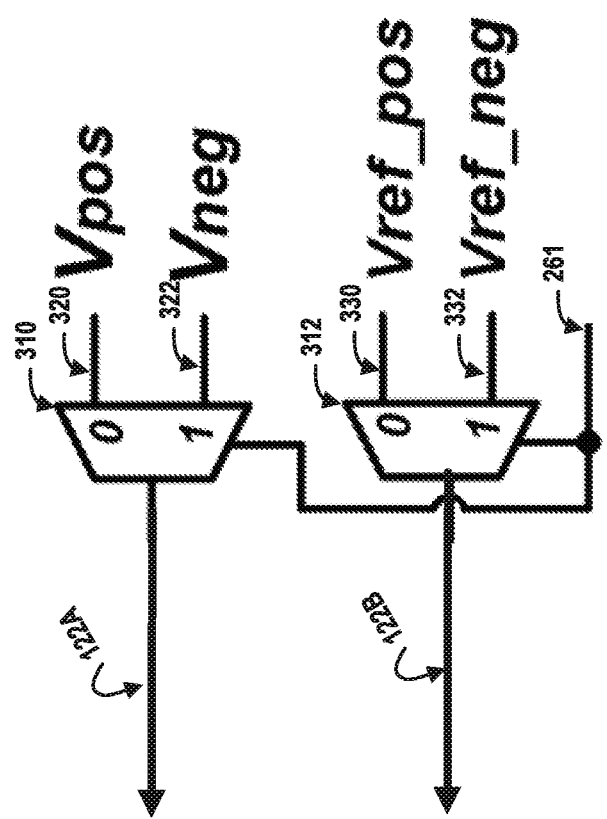
FIG. 3 is a block diagram of an example of a feedback selection circuitry in accordance with various embodiments.

FIG. 3 is a block diagram of an example of a feedback selection circuitry 300 in accordance with various embodiments. The feedback selection circuitry 300 represents an implementation of the feedback selection circuitry 120 in the case of a switching regulator 130 having two channels (e.g., one positive channel, Vpos, and one negative channel, Vneg). The feedback selection circuitry 300 includes a first multiplexer 310 and a second multiplexer 312. The feedback selection circuitry 300 controls which signals are output by the first and second multiplexers 310 and 312 based on the signal 261 received from the transient detection circuitry 200.

The first multiplexer 310 receives a positive channel output voltage Vpos 320 (which may be the same as Vpos 210) from the switching regulator 130 at a first input and a negative channel output voltage Vneg 322 (which may be the same as Vneg 212) at a second input. When the signal 261 received from the transient detection circuitry 200 indicates the presence of a transient on the negative channel output voltage Vneg 322, the first multiplexer 310 selects the positive channel output voltage Vpos 320 for output as a first signal 122A. Alternatively, when the signal 261 received from the transient detection circuitry 200 indicates the presence of a transient on the positive channel output voltage Vpos 320, the first multiplexer 310 selects the negative channel output voltage Vneg 322 for output as the first signal 122A.

The second multiplexer 312 selects the corresponding target value (reference voltage) for the voltage signal selected by the first multiplexer 310. Specifically, the second multiplexer 312 receives a first target value 330 (Vref_pos) corresponding to the positive channel output at a first input and a second target value 332 (Vref_neg) corresponding to the negative channel output at a second input. When the signal 261 received from the transient detection circuitry 200 indicates the presence of a transient on the negative channel output voltage Vneg 322, the second multiplexer 312 selects the first target value 330 corresponding to the positive channel output for output as a second signal 122B. Alternatively, when the signal 261 received from the transient detection circuitry 200 indicates the presence of a transient on the positive channel output voltage Vpos 320, the second multiplexer 312 selects the second target value 332 corresponding to the negative channel output for output as the second signal 122B. The signals 122A-B control the way in which the control circuitry 140 generates the differential loop signals 142 for controlling switches of the differential loop in the manner discussed below in connection with FIG. 4.

Figure 4:
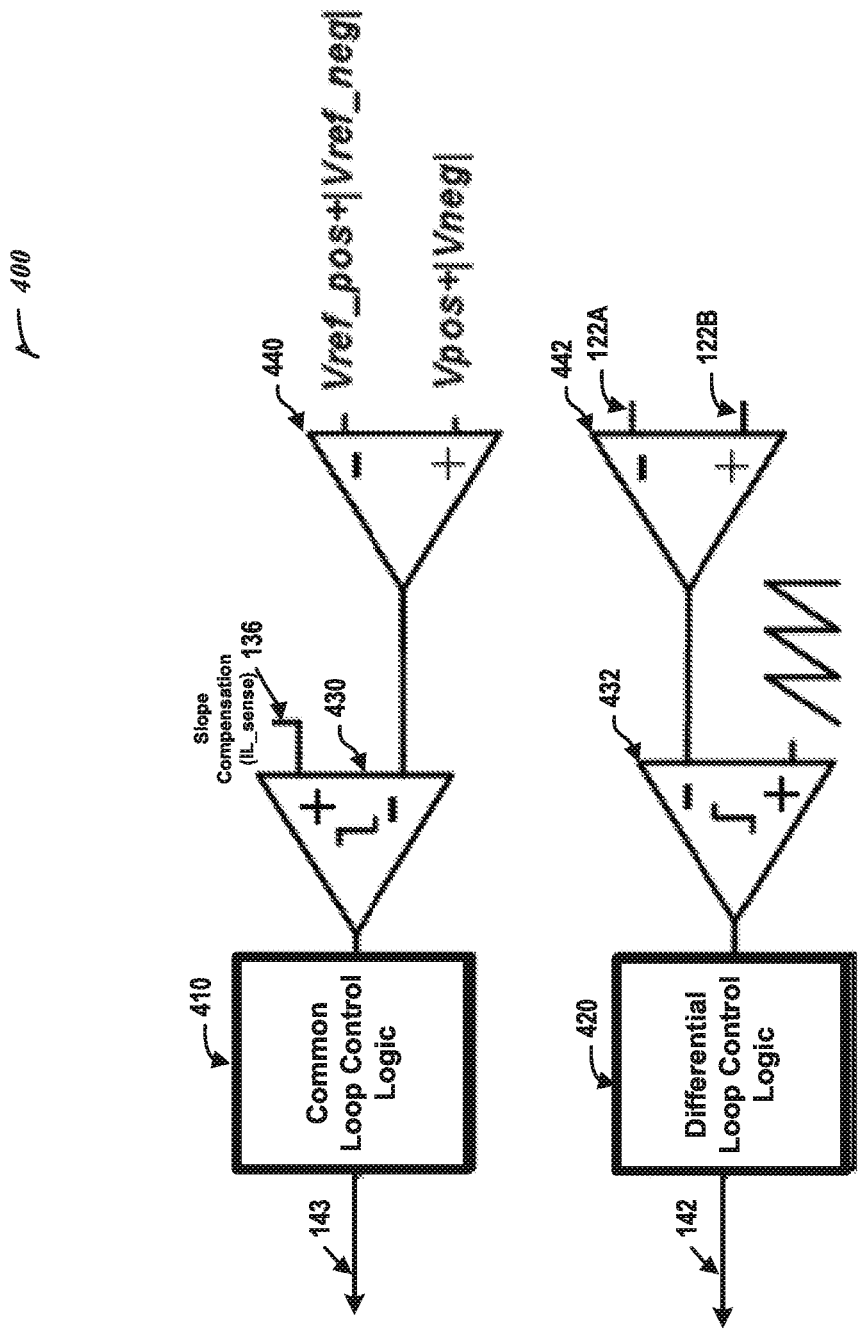
FIG. 4 is a block diagram of an example of a control circuitry in accordance with various embodiments.

FIG. 4 is a block diagram of an example of a control circuitry 400 in accordance with various embodiments. The control circuitry 400 represents an implementation of the control circuitry 140 in the case of a switching regulator 130 having two channels (e.g., one positive channel, Vpos, and one negative channel, Vneg). The control circuitry 400 includes first and second error amplifiers 440 and 442, first and second comparators 430 and 432, common-loop control logic 410, and differential-loop control logic 420.

The common-loop control logic 410 generates common loop signals 143 for controlling switching operations of the switches 132A-C. The common loop signals 143 are based on current voltages across all of the positive and negative channels of the switching regulator 130. In an embodiment, the first error amplifier 440 compares a sum of all the positive channel outputs and all the negative channel outputs with a sum of their respective target values. For example, in the case of the switching regulator 130 outputting two channels, the first error amplifier 440 receives, at a first input, a sum of the negative channel output voltage Vneg 322 and the positive channel output voltage Vpos 320. The first error amplifier 440 receives, at a second input, a sum of the corresponding first and second target values 330 and 332. The first error amplifier 440 computes an error based on a difference between the aggregated sums of the channel output voltages and the corresponding target values and outputs this error to the first comparator 430 (e.g., a PWM comparator). The first comparator 430 receives the IL_sense signal 136 (which in some implementations is previously combined with or added to a slope compensation signal) from the switching regulator 130 and generates a difference signal based on a difference between the IL_sense signal 136 (representing the current flowing through the inductor 131) and the error provided by the first error amplifier 440. This difference signal is received by the common-loop control logic 410, which controls the common-loop switching operations of the switching regulator 130 to charge and discharge the inductor 131.

The differential-loop control logic 420 generates differential loop signals 142 for controlling switching operations of individual switches associated with each channel (e.g., switches Snk, ..., Sn1 and switches Sp1, ..., Sp1). The differential loop signals 142 are based on current voltages across a subset of the positive and negative channels of the switching regulator 130 on which a transient is not present or indicated by the transient detection circuitry 110. In an embodiment, the second error amplifier 442 compares a given voltage signal with its respective target value. In some embodiments, the second error amplifier 442 includes multiple error amplifiers (e.g., when the switching regulator 130 includes more than two channels at the output) each configured to receive a corresponding voltage output signal of a given channel and a corresponding target value.

In the case of the switching regulator 130 outputting two channels, the second error amplifier 442 receives, at a first input, the current channel output voltage signal 122A selected by the feedback selection circuitry 300 and the corresponding target value signal 122B selected by the feedback selection circuitry 300. For example, when the signal 261 received from the transient detection circuitry 200 indicates the presence of a transient on the negative channel output voltage Vneg 322, the second error amplifier 442 receives the first target value 330 as the second signal 122B and the positive channel output voltage Vpos 320 as the first signal 122A. Similarly, when the signal 261 received from the transient detection circuitry 200 indicates the presence of a transient on the positive channel output voltage Vpos 320, the second error amplifier 442 receives the second target value 332 as the second signal 122B and the negative channel output voltage Vneg 322 as the first signal 122A.

The second comparator 432 receives the slope signal (e.g., a predetermined clock signal with the same frequency as the switching frequency of the switching regulator 130) from the switching regulator 130 and generates a difference signal based on a difference between the slope signal and the error provided by the second error amplifier 442. This difference signal is received by the differential-loop control logic 420, which controls the differential-loop switching operations of the switching regulator 130 to control current through individual channels. In some embodiments, the second comparator 432 includes multiple comparators (e.g., when the switching regulator 130 includes more than two channels at the output) each configured to receive a corresponding error signal from a respective one of the error amplifiers of the second error amplifier 442 and the slope signal. The outputs of all the comparators of the second comparator 432 are provided to the differential-loop control logic 420 to generate the differential loop signals 142.

Figure 5:
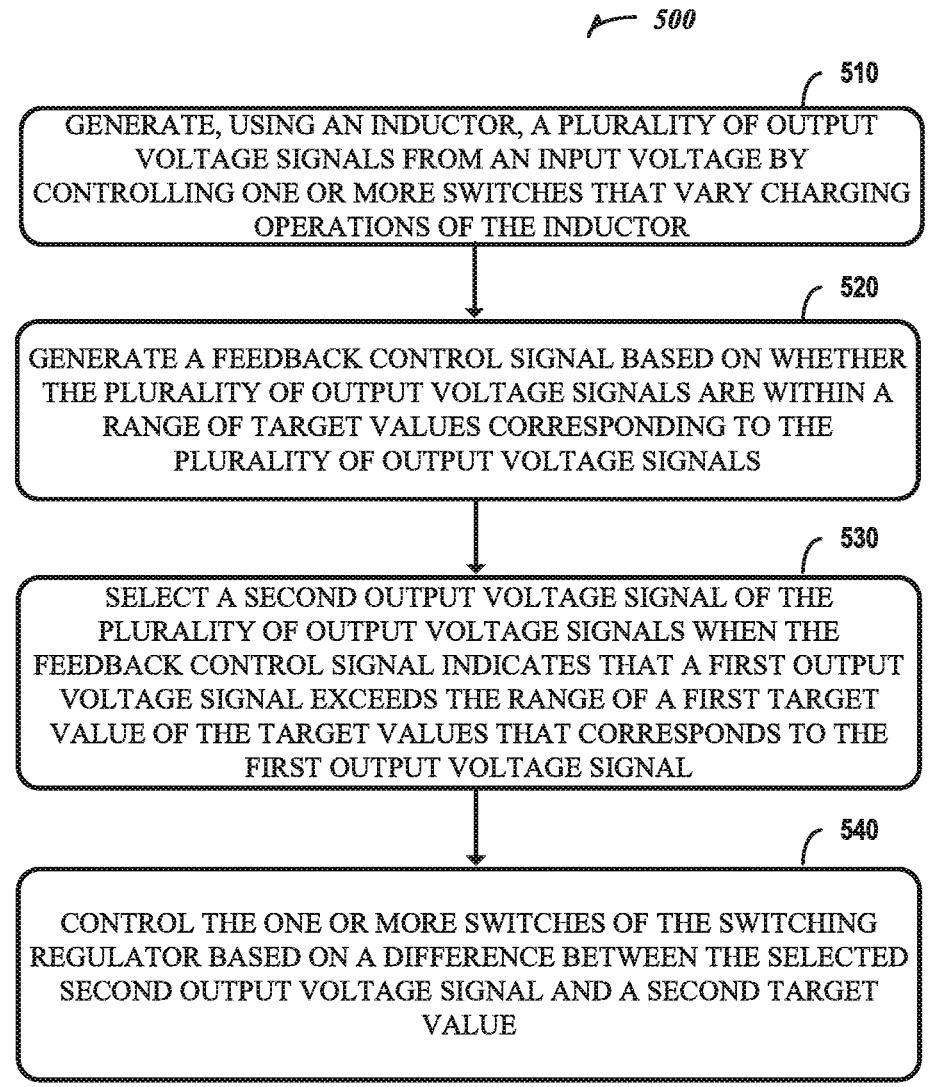
FIG. 5 is a flow diagram depicting example processes for controlling switching operations of a switching regulator in accordance with various embodiments.

FIG. 5 is a flow diagram depicting an example process 500 for controlling switching operations of a switching regulator in accordance with various embodiments. The operations of the process 500 may be performed in parallel or in a different sequence, or may be entirely omitted. In some embodiments, some or all of the operations of the process 500 may be embodied on a computer-readable medium and executed by one or more processors.

At operation 510, the switching regulator 130 generates, using the inductor 131, a plurality of output voltage signals from an input voltage by controlling one or more switches (e.g., the common loop switches 132A-C and differential loop switches) that vary charging operations of the inductor 131.

At operation 520, the transient detection circuitry 110 generates a feedback control signal based on whether the plurality of output voltage signals are within a range of target values corresponding to the plurality of output voltage signals.

At operation 530, the feedback selection circuitry 120 selects a second output voltage signal of the plurality of output voltage signals when the feedback control signal indicates that a first output voltage signal of the plurality of output voltage signals exceeds the range of a first target value of the target values that corresponds to the first output voltage signal.

At operation 540, the control circuitry 140 controls the one or more switches of the switching regulator 130 based on a difference between the selected second output voltage signal and a second target value of the target values that corresponds to the second output voltage signal.

Figure 6:
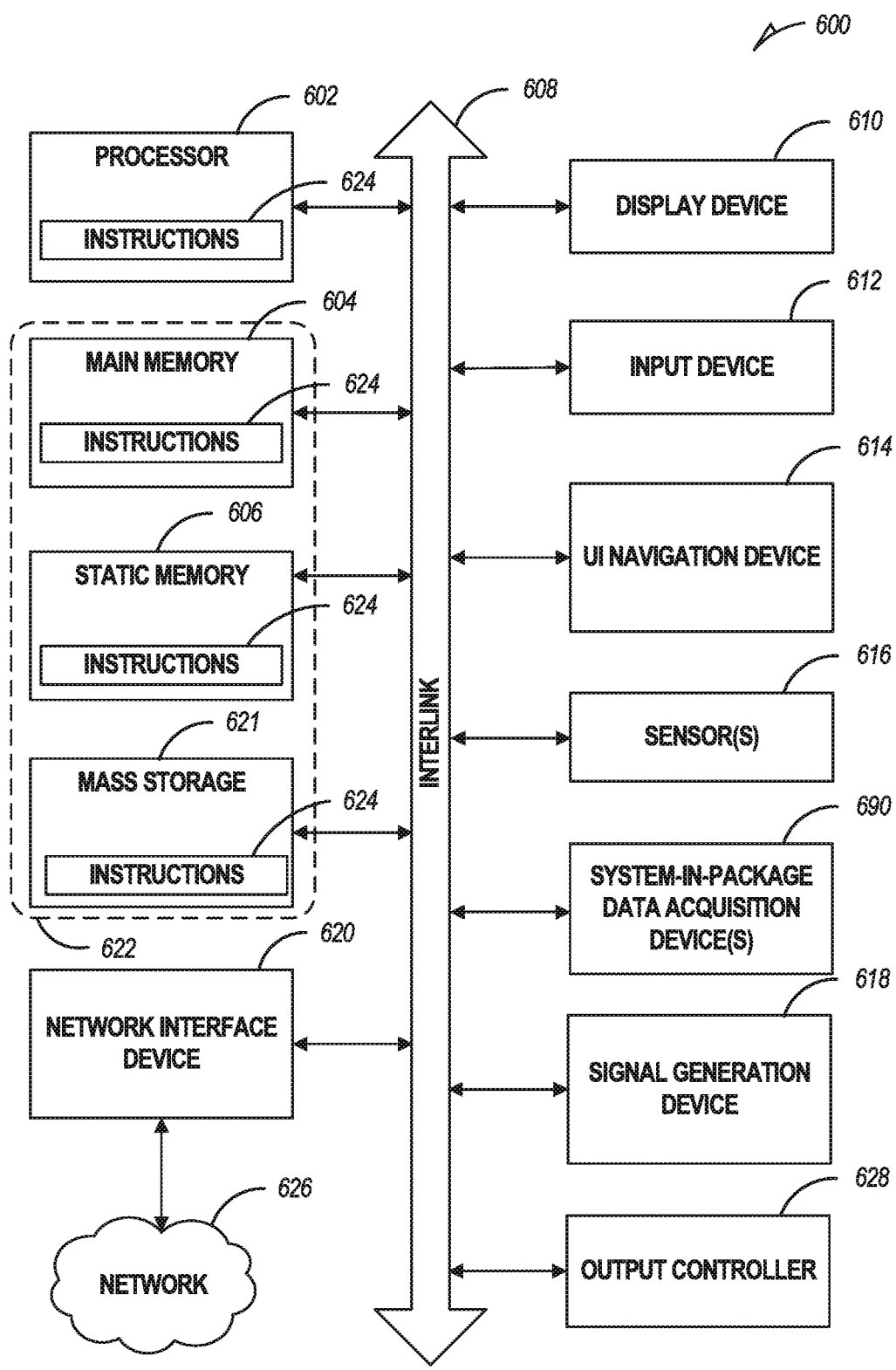
FIG. 6 is a block diagram illustrating an example of a machine upon which one or more embodiments may be implemented.

FIG. 6 is a block diagram of an example machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in a peer-to-peer (P2P) (or other distributed) network environment. The machine 600 may be a personal computer (PC), a tablet PC, a set-top box (STB), a personal digital assistant (PDA), a mobile telephone, a web appliance, an IoT device, an automotive system, an aerospace system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant-massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 600 may include a hardware processor 602 (e.g., a central processing unit (CPU), a graphics processing unit (GPU), a hardware processor core, or any combination thereof, such as a memory controller, etc.), a main memory 604, and a static memory 606, some or all of which may communicate with each other via an interlink (e.g., bus) 608. The machine 600 may further include a display device 610, an alphanumeric input device 612 (e.g., a keyboard), and a user interface (UI) navigation device 614 (e.g., a mouse). In an example, the display device 610, alphanumeric input device 612, and UI navigation device 614 may be a touchscreen display. The machine 600 may additionally include a storage device 622 (e.g., drive unit); a signal generation device 618 (e.g., a speaker); a network interface device 620; one or more sensors 616, such as a Global Positioning System (GPS) sensor, wing sensors, mechanical device sensors, temperature sensors, ICP sensors, bridge sensors, audio sensors, industrial sensors, a compass, an accelerometer, or other sensors; and one or more system-in-package data acquisition devices 690. The system-in-package data acquisition device(s) 690 may implement some or all of the functionality of the SIMO switching regulator system 100. The machine 600 may include an output controller 628, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The storage device 622 may include a machine-readable medium on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 621 may constitute the machine-readable medium.

While the machine-readable medium is illustrated as a single medium, the term "machine-readable medium" may include a single medium or multiple media (e.g., a centralized or distributed database, or associated caches and servers) configured to store the one or more instructions 624.

The term "machine-readable medium" may include any transitory or non-transitory medium that is capable of storing, encoding, or carrying transitory or non-transitory instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 (e.g., software, programs, an operating system (OS), etc.) or other data that are stored on the storage device 621 can be accessed by the main memory 604 for use by the hardware processor 602. The main memory 604 (e.g., DRAM) is typically fast, but volatile, and thus a different type of storage from the storage device 621 (e.g., an SSD), which is suitable for long-term storage, including while in an "off" condition. The instructions 624 or data in use by a user or the machine 600 are typically loaded in the main memory 604 for use by the hardware processor 602. When the main memory 604 is full, virtual space from the storage device 621 can be allocated to supplement the main memory 604; however, because the storage device 621 is typically slower than the main memory 604, and write speeds are typically at least twice as slow as read speeds, use of virtual memory can greatly reduce user experience due to storage device latency (in contrast to the main memory 604, e.g., DRAM). Further, use of the storage device 621 for virtual memory can greatly reduce the usable lifespan of the storage device 621.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, peer-to-peer (P2P) networks), among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible or intangible medium that is capable of storing, encoding, or carrying instructions for execution by the machine 600, and includes digital or analog communications signals or other tangible or intangible media to facilitate communication of such software.

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the inventive subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended; that is, a system, device, article, composition, formulation, or process that includes elements in addition to those listed after such a term in a claim are still deemed to fall within the scope of that claim. Moreover, in the following claims, the terms "first," "second," "third," etc. are used merely as labels, and are not intended to impose numerical requirements on their objects.

Method examples described herein may be machine- or computer-implemented at least in part. Some examples may include a computer-readable medium or machine-readable medium encoded with transitory or non-transitory instructions operable to configure an electronic device to perform methods as described in the above examples. An implementation of such methods may include code, such as microcode, assembly-language code, a higher-level-language code, or the like. Such code may include transitory or non-transitory computer-readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above detailed description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the detailed description as examples or embodiments, with each claim standing on its own as a separate embodiment, and it is contemplated that such embodiments may be combined with each other in various combinations or permutations. The scope of the inventive subject matter should be determined with reference to the appended claims, along with the full scope of equivalents to which such claims are entitled.

What is claimed is:

1. A system for controlling switching operations of a switching regulator, the system comprising:
   a switching regulator configured to use an inductor to generate a plurality of output voltage signals on a plurality of channels from an input voltage by controlling one or more switches of the switching regulator that vary charging operations of the inductor, each of the plurality of channels configured to be coupled to a respective load to generate a respective output voltage signal of the plurality of output voltage signals;
   transient detection circuitry coupled to receive concurrently the plurality of output voltage signals respectively from the plurality of channels and configured to generate a feedback control signal having a first value that is indicative of a first of the plurality of output voltage signals being within a first range of target values and having a second value that is indicative of a second of the plurality of output voltage signals being within a second range of target values;
feedback selection circuitry coupled to receive the plurality of output voltage signals and configured to select the second output voltage signal of the plurality of output voltage signals when the feedback control signal indicates that the first output voltage signal of the plurality of output voltage signals exceeds the range of a first target value of the target values that corresponds to the first output voltage signal; and
control circuitry configured to control the one or more switches of the switching regulator based on a difference between the second output voltage signal selected by the feedback selection circuitry and a second target value of the target values that corresponds to the second output voltage signal.

2. The system of claim 1, further comprising:
a first set of logic elements including a first logic element coupled to a first storage element, the first set of logic elements configured to generate the first value based on outputs of a first plurality of comparator circuits coupled to receive the first output voltage signal; and
a second set of logic elements including a second logic element coupled to a second storage element, the second set of logic elements configured to generate the second value based on outputs of a second plurality of comparator circuits coupled to receive the second output voltage signal, wherein a first output of the first storage element is logically combined with a second output of the second storage element to generate the feedback control signal.

3. The system of claim 1, wherein the transient detection circuitry comprises:
a first comparator circuit configured to generate a first signal when the first output voltage signal exceeds the first target value incremented by a first offset value;
a second comparator circuit configured to generate a second signal when the first output voltage signal exceeds the first target value decremented by the first offset value; and
a first set of logic elements configured to generate the first value when the first output voltage signal exceeds the range of the first target value by logically combining the first and second signals.

4. The system of claim 3, wherein the transient detection circuitry comprises:
a third comparator circuit configured to generate a third signal when the second output voltage signal exceeds the second target value incremented by the first offset value;
a fourth comparator circuit configured to generate a fourth signal when the second output voltage signal exceeds the second target value decremented by the first offset value; and
a second set of logic elements configured to generate the second value when the second output voltage signal exceeds the range of the second target value by logically combining the third and fourth signals.

5. The system of claim 4, wherein the first set of logic elements includes a first logic element coupled to a first storage element, wherein the second set of logic elements includes a second logic element coupled to a second storage element, and wherein a first output of the first storage element is logically combined with a second output of the second storage element to generate the feedback control signal.

6. The system of claim 5, wherein the first storage element is triggered to store and output a given value in response to an output of the first logic element that combines the first and second signals, and wherein the first output of the first storage element is reset in response to an output of the second logic element that combines the third and fourth signals.

7. The system of claim 1, wherein the feedback selection circuitry is coupled to receive the target values, and wherein the feedback selection circuitry is further configured to select the second target value based on the feedback control signal and output to the control circuitry the selected second target value.

8. The system of claim 7, wherein the feedback selection circuitry comprises:
a first selection circuit coupled to the plurality of output voltage signals and the feedback control signal, wherein the first selection circuit is configured to select the second output voltage signal for output based on the feedback control signal; and
a second selection circuit coupled to the target values and the feedback control signal, wherein the second selection circuit is configured to select the second target value for output based on the feedback control signal.

9. The system of claim 1, wherein the control circuitry comprises a comparator circuit configured to compare the second output voltage signal selected by the feedback selection circuitry with the second target value.

10. The system of claim 9, wherein the control circuitry is further configured to apply slope compensation to an output of the comparator circuit.

11. The system of claim 1, wherein the one or more switches of the switching regulator comprise a first set of switches that control common-loop charging operations of the inductor and a second set of switches that control differential-loop charging operations of the inductor.

12. The system of claim 11, wherein the control circuitry is further configured to:
aggregate the plurality of output voltage signals into a first control value;
aggregate the target values into a second control value;
control the first set of switches based on a comparison between the first and second control values; and
control the second set of switches based on the difference between the second output voltage signal selected by the feedback selection circuitry and the second target value.

13. The system of claim 1, wherein a first set of the plurality of output voltage signals including the first output voltage signal is received from a first terminal of the inductor, and wherein a second set of the plurality of output voltage signals is received from a second terminal of the inductor.

14. A method for controlling switching operations of a switching regulator, the method comprising:
generating, using an inductor, a plurality of output voltage signals on a plurality of channels from an input voltage by controlling one or more switches that vary charging operations of the inductor, each of the plurality of channels configured to be coupled to a respective load to generate the respective output voltage signal of the plurality of output voltage signals;
generating a feedback control signal having a first value that is indicative of a first of the plurality of output voltage signals being within a first range of target values and having a second value that is indicative of a second of the plurality of output voltage signals being within a second range of target values;

selecting the second output voltage signal of the plurality of output voltage signals when the feedback control signal indicates that the first output voltage signal of the plurality of output voltage signals exceeds the range of a first target value of the target values that corresponds to the first output voltage signal; and controlling the one or more switches of the switching regulator based on a difference between the selected second output voltage signal and a second target value of the target values that corresponds to the second output voltage signal.

15. The method of claim 14, wherein the one or more switches of the switching regulator comprise a first set of switches that control common-loop charging operations of the inductor and a second set of switches that control differential-loop charging operations of the inductor.

16. The method of claim 15 further comprising:
aggregating the plurality of output voltage signals into a first value;
aggregating the target values into a second value;
controlling the first set of switches based on a comparison between the first and second values; and
controlling the second set of switches based on the difference between the second output voltage signal and the second target value.

17. The method of claim 14 further comprising selecting the second target value from the target values when the feedback control signal indicates that the first output voltage signal exceeds the range of the first target value.

18. The method of claim 14 further comprising:
generating a first signal when the first output voltage signal exceeds the first target value incremented by a first offset value;
generating a second signal when the first output voltage signal exceeds the first target value decremented by the first offset value; and logically combining the first and second signals to indicate that the first output voltage signal exceeds the range of the first target value.

19. An apparatus for controlling switching operations of a switching regulator, the apparatus comprising:

means for generating, using an inductor, a plurality of output voltage signals from an input voltage by controlling one or more switches that vary charging operations of the inductor;

means for generating a feedback control signal based on whether the plurality of output voltage signals are within a range of target values corresponding to the plurality of output voltage signals;

means for selecting a second output voltage signal of the plurality of output voltage signals when the feedback control signal indicates that a first output voltage signal of the plurality of output voltage signals exceeds the range of a first target value of the target values that corresponds to the first output voltage signal; and means for controlling the one or more switches of the switching regulator based on a difference between the selected second output voltage signal and a second target value of the target values that corresponds to the second output voltage signal.

20. The apparatus of claim 19 further comprising:

means for generating a first signal when the first output voltage signal exceeds the first target value incremented by a first offset value;

means for generating a second signal when the first output voltage signal exceeds the first target value decremented by the first offset value; and means for logically combining the first and second signals to indicate that the first output voltage signal exceeds the range of the first target value.

* * * * *

UNITED STATES PATENT AND TRADEMARK OFFICE
CERTIFICATE OF CORRECTION

PATENT NO. : 10,790,744 B1
APPLICATION NO. : 16/358490
DATED : September 29, 2020
INVENTOR(S) : Lu et al.

Page 1 of 1

It is certified that error appears in the above-identified patent and that said Letters Patent is hereby corrected as shown below:

On the Title Page

Item (22), in Column 1, Line 1, after "2019", insert:
--¶(65) Prior Publication Data
US 2020/0304020 A1 Sep. 24, 2020--

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*